April 30, 1935.        A. E. BILL        1,999,890
BEEHIVE
Filed March 13, 1934
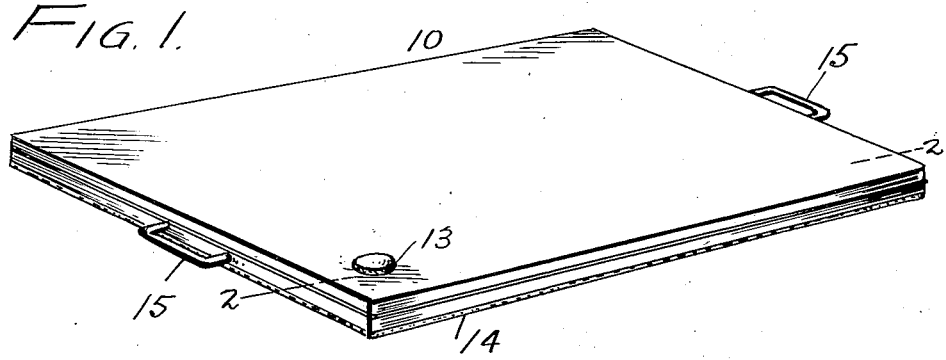
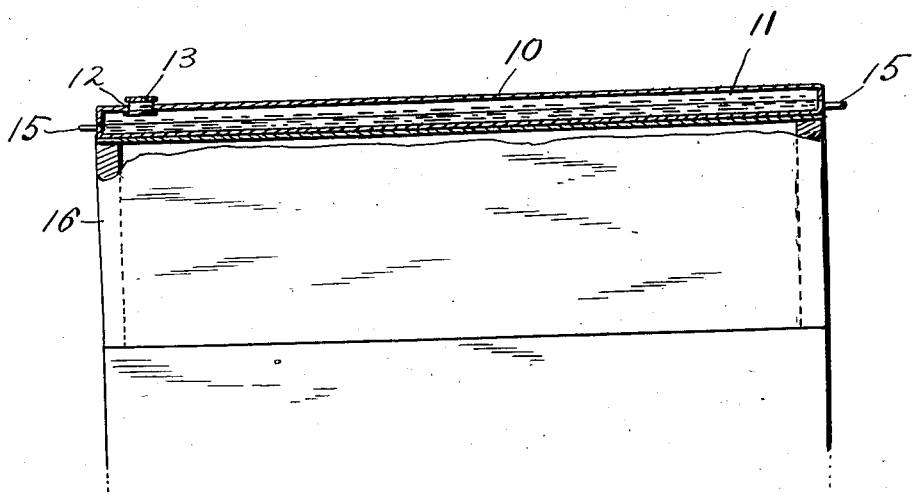
Inventor
Arthur E. Bill,
By Chas Williamson
Attorney Patented Apr. 30, 1935

1,999,890

UNITED STATES PATENT OFFICE 1,999,890

BEEHIVE

Arthur E. Bill, Rensselaer Falls, N. Y.

Application March 13, 1934, Serial No. 715,344

3 Claims. (Cl. 6—12)

My invention has to do primarily with removal of honey from the supers of beehives without trouble from the bees and without harm or injury to the bees themselves. And an important object of my invention is to provide simple, inexpensive and easily employed means that will give off or supply fumes within the hive, which will cause the bees to go down into the hive from the super and remain away therefrom while the stored honey is being removed. I embody my invention in a member adapted to generate and give off fumes by the application of heat which will have the described effect on the bees and, of course, without any injury to them and which has such form and proportions that it may be readily placed on top of the supers. In its use, nothing more is required than to lift off the hive cover and to place the fume-generator on the super resting on the same. My invention, however, consists in whatever is described by or is included within the terms or scope of the appended claims.

In the drawing:

Fig. 1 is a perspective view of a fume-producing or generating device embodying my invention;

Fig. 2 is a view in vertical section of the upper part of a beehive equipped with my invention.

In what I now consider a very satisfactory embodiment of my invention, it comprises a flat pan-like structure 10, made of sheet metal with top, bottom and side walls that enclose a chamber 11, for some conveniently used heating medium such as hot water or steam and which has such horizontal dimensions that it may be easily placed on the top or super of any standard beehive and which is shallow from top to bottom. By way of example, and only as an example, the external horizontal dimensions may be a length of 20 inches, a width of 16½ inches and the depth may be 1 inch. The top wall of the container or receptacle thus provided may have a hole 12, closed by a removable plug 13, for filling with the heating medium. Preferably, on the bottom, is secured a sheet or layer 14, of some liquid absorbent material such as a piece of cotton flannel that will absorb some readily heat-vaporized liquid such as carbolic acid from which fumes will be generated or given off by reason of the close proximity thereof to the heating medium. And these fumes or vapors being disseminated through the super will drive the bees therefrom. Incidentally, of course, the effect of such fumes as are a disinfectant is to wholesomely fumigate the interior of the hive. The carbolic acid or other fume-generating agent is sprinkled on the sheet of absorbent material.

For convenient handling, the metal container is provided with a suitable handle or handles applied where most convenient. As shown in the drawing, there is a handle 15 at each end.

For convenient manufacture, the container may be made of two similar or duplicate parts united or joined (separately if desired) by a joint along the vertical side and end walls.

Fig. 2 of the drawing shows my fume-producing device in place on the super 16 of a conventional hive, the cover being removed.

The simplicity and ease or convenience of handling or manipulation of my invention compared with the use of the bee-smoker are obvious.

The filler hole, of course, may be placed wherever it is convenient and the plug or closure may be flush with the external surface or sunk.

What I claim is:

1. A fume-producing device comprising a vertically shallow member of such external dimensions as readily to be applied to a beehive, said member having flat horizontal top and bottom and having a holder on its bottom that is liquid absorbent for a material adapted to give off fumes obnoxious to bees.

2. A beehive having a super and a fume generating device of flat shallow proportions situated above the frames in the super and extending substantially across from side to side thereof and having on its underside a sheet of liquid absorbing material, said device being hollow to provide a chamber for a heating medium adapted to evaporate a liquid supplied to the absorbent material.

3. A beehive having a super and a fume generating device positioned above the frames in the super and adapted to hold a heating medium therein, said device including on its underside a holder for a material adapted to give off fumes obnoxious to bees when such material is subjected to heat.

ARTHUR E. BILL.